United States Patent [19]
Kronogard

[11] 3,889,771
[45] June 17, 1975

[54] UNIVERSAL GAS TURBINE AUTOMOTIVE ENGINE

[75] Inventor: Sven Olof Kronogard, Lomma, Sweden

[73] Assignee: United Turbine AB and Co., Kommanditbolag, Malmo, Sweden

[22] Filed: May 2, 1974

[21] Appl. No.: 466,502

[30] Foreign Application Priority Data
May 22, 1973 Sweden................................ 7307155

[52] U.S. Cl. ....... 180/44 R; 60/39.16 SI; 74/DIG. 5; 180/66 A
[51] Int. Cl............................................... B60k 3/04
[58] Field of Search......... 180/44 R, 54 F, 66 A, 67; 74/705, DIG. 5; 60/39.16

[56] References Cited
UNITED STATES PATENTS
3,488,947   1/1970   Miller............................ 60/39.16 SI
3,498,057   3/1970   Kronogard..................... 180/66 A X FOREIGN PATENTS OR APPLICATIONS
706,070   3/1954   United Kingdom............... 180/66 A
277,818   5/1965   Australia........................... 180/44 R Primary Examiner—David Schonberg
Assistant Examiner—T. L. Siemens
Attorney, Agent, or Firm—Holman & Stern

[57] ABSTRACT

In order to make an automotive engine universally applicable for a 2- or for 4-wheel drive, for mounting forwards or in the rear, and with its axis longitudinally or transversely, a gas turbine provided with at least two turbine rotors is used. The rotors are interconnected by means of a transmission and are further connected to a torque divider having two output shafts. One of these output shafts is arranged to pass through a hollow shaft in the rotor/transmission system, thus making possible the driving of wheels located to opposite sides of the engine.

4 Claims, 5 Drawing Figures

UNIVERSAL GAS TURBINE AUTOMOTIVE ENGINE

BACKGROUND OF THE INVENTION

The demands upon an automotive vehicle concerning the emissions in the exhaust gases are very rigid, and may be expected to be still further increased. A further demand, which also will be raised, concerns an increased safety with respect to maneuver ability, capacity for taking curves, acceleration and retardation on slippery shippery roads, as well as with respect to injuries to passengers and damages to material caused by collisions. The latter consideration will necessitate more efficient bumpers requiring increased space forwards and in the rear, which means an increased length and cost of the car, or a reduction of the space available for passengers and luggage. Neither is acceptable to any large extent.

SUMMARY OF THE INVENTION

The object of the present invention is to provide an automotive engine having a low emission content, and which furthermore will have a very compact structure, so collision bumpers may be fitted to the car without noticeably increasing the length thereof, and which also is adapted to permit mounting in cars of different types and sizes. It may thus be used for driving two wheels or two pairs of wheels, i.e., provide a four-wheel drive, and it may be mounted with its longitudinal axis parallel with, or transversely to the longitudinal axis of the car. The four-wheel drive will, as is well known, provide a doubled frictional contact with the road, making possible a more rapid and safer driving through curves, as well as better acceleration and retardation which means increased safety, especially on slippery roads.

The engine is a gas turbine, which may be designed so as to have low emission contents, and in order to attain the desired compact structure, it includes at least two rotors which are interconnected by a transmission including a torque divider having two output shafts, of which one is mounted within a hollow shaft in the transmission system of the turbine system.

The turbine preferably is of the triple spool type, in which the transmission members provide a very fine torque characteristic. This means that a reversing gear only will be required outside the engine, possibly augmented by some simple reduction step.

The engine is especially suited for a four-wheel drive, but may also be mounted transversely for driving two wheels only, with the engine on such occasion being located in the forward end, or in the rear of the car.

DESCRIPTION OF SOME PREFERRED EMBODIMENTS

In all figures the components are schematically shown only and it is presupposed that the main elements of a gas turbine and of the transmission of a car, respectively, are known per se.

Figure 1:
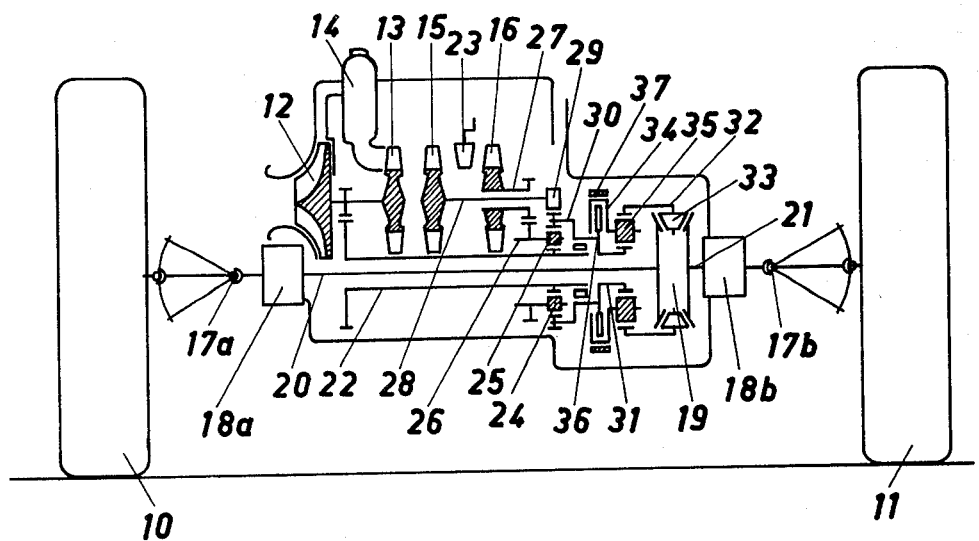
FIG. 1 shows an arrangement for a twin wheel drive with a transversely mounted engine.

With the arrangement according to FIG. 1, the engine is a gas turbine, which is mounted with its system of axes transversely with respect to the longitudinal direction of the car, and which is adapted to drive two wheels 10 and 11, respectively, of the car. This arrangement may be used for driving the front wheels as well as the rear wheels. As no steering arrangement is shown in FIG. 1, this can be understood as referring to a rear engine.

The prime mover includes a compressor 12, which is driven by a first turbine rotor 13, a combustion chamber 14 and two power turbine rotors 15 and 16.

The wheels 10 and 11 are mounted in conventional suspension means of the knee joint type 17a, 17b in such a manner that an individual spring action is obtained, and are connected to a differential 19 of standard type having bevel gears. This differential divides the input onto two output shafts 20 and 21, which are connected to the wheels by reduction steps 18a and 18b, respectively. The differential is located to one side of the engine, and shaft 21 extends directly to the knee joint 17b by way of the final reduction step 18b, while the first mentioned shaft 20 extends straight through the engine, passing through hollow shaft 22, which connects the rotor system 12, 13 of the compressor with the transmission between the power turbine rotors and the differential 19.

Adjustable inlet vanes 23 are fitted between the turbine rotors 15 and 16, which make possible a distribution of the available energy between the two rotors.

The hollow shaft 22 carries, at its end remote from the compressor, a sun wheel 24, which cooperates with a first set of planetary wheels 25, carrier 26 of which is driven from the power turbine rotor 16 by way of hollow shaft 27.

A shaft 28 of the power turbine rotor 15 passes through the hollow shaft 27 and drives a pinion 29 meshing with a ring wheel 30 having internal and external teeth. This ring wheel is connected to a sun wheel 31 of a second planetary gear, a ring wheel 32 of which is connected to bevelled planetary gears 33 of the differential 19.

Carrier 34 for planetary wheels 35 in the second planetary gear is formed as one part of a clutch 36, the other part of which may be locked by means of a brake 37, whereby the ring wheel 32 and the sun wheel 31 in well known manner may be brought to rotate in the same, or in opposite directions depending upon which of the components being occasionally locked.

Figure 3:
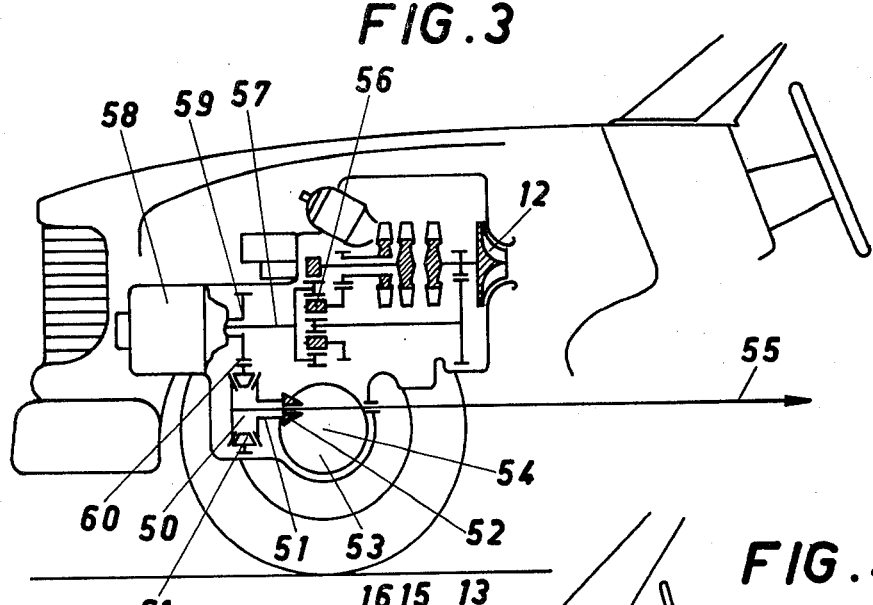
FIGS. 3 and 4 show modifications of this arrangement.

As shaft 20 has a possibility to pass through the hollow shaft 22, the driving engine may be given very reduced height and be made very compact, requiring small space. In cars where the measure between the wheels is reduced or where a possibility for extended, individual movements of the wheels if required, an increase of the distance between the knee joints 17a, 17b and the wheels 10 and 11 may be obtained by arranging the power transfer basically as shown in FIG. 3.

Figure 2:
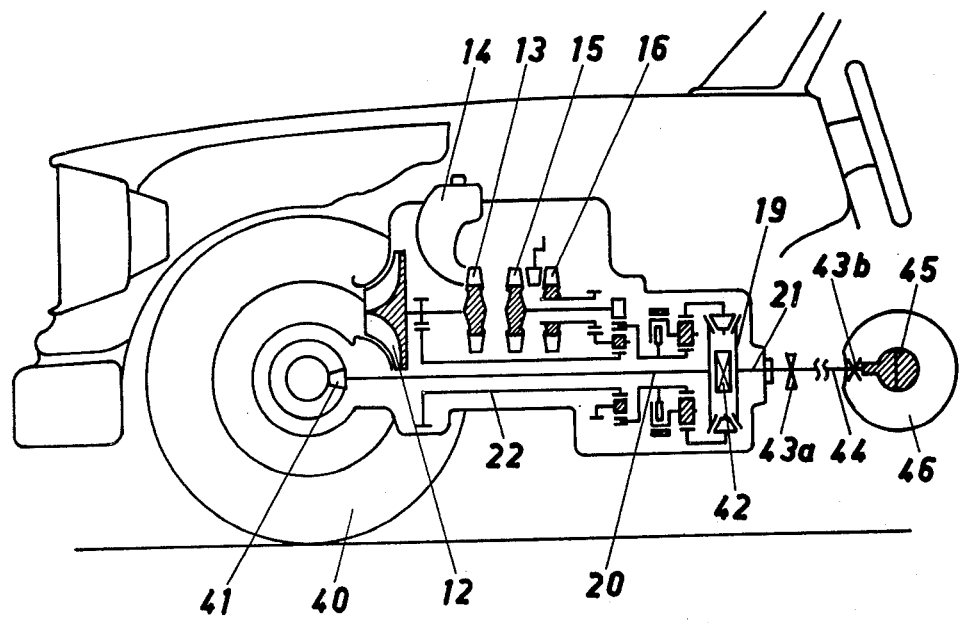
FIG. 2 shows an arrangement for a four-wheel drive with an engine located at the front end of a car.

The arrangement shown in FIG. 2 includes a driving engine of the same type as in FIG. 1, but here fitted for four-wheel driving and with the engine mounted in the front of the car having its system of axes parallel to the longitudinal direction thereof.

As far as is possible the same reference numerals have been used as in FIG. 1. A pair of front wheels is here denoted by 40 and the torque to these wheels will be transferred from shaft 20 by way of a front axle differential 41. In the same manner, the rear wheels will be driven by means of a shaft 44 having universal joints 43a and 43b by way of a rear shaft differential 45.

The rear output shaft 44 with the pertaining differential, as well as the front shaft differential, will each transfer about one half of the torque, and may therefore be designed with reduced dimensions compared to the differential of the previous embodiment. This is further promoted as the engine will have a very smooth running characteristic compared to what is obtainable with piston engines. The driving shaft extending rearwards will thus not necessarily be a rigid element, but may, run in an arc having a big radius R below and suitably journalled in the chassis between the universal joints 43a and 43b. This is further facilitated by the omission of the final reduction steps 18a, 18b shown in FIG. 1, which gears have been substituted by the driving axle differentials 41 and 45, thereby still further reducing the divided torque.

This arrangement makes possible a very compact design and leaves satisfactory space ahead of the front wheels for mounting bumpers, filters and auxiliary apparatus.

Alternatively, the differential 19 may be substituted by a simple planetary gear, for instance with shaft 20 connected to the ring wheel and shaft 21 connected to the sun wheel. Hence a larger portion of the torque will be transferred to the front wheels resulting in better driving properties.

The engine will however extend some distance back of the front wheels, which usually will not cause any troubles. In order to reduce the built-in measure in this respect, the engine may, however, according to FIG. 3 be located partly above the front axle, which may be interesting for certain small, compact cars. A corresponding arrangement of the power output may be used with a transversely mounted engine to obtain the necessary length of the swinging drive shafts between the power output differential and the wheels.

The gas turbine proper includes the same rotor components as in the previous embodiments. Compressor 12 is however, here located at the rear end of the engine and the transmission and the differential are located above and in front of the front axle.

The differential is denoted by 50. One of the shafts 51 is tubular and carries a bevelled pinion 52, having hypoid teeth, which cooperate with a corresponding gear wheel 53 in the front wheel differential. The driving shaft 51 is displaced upwards with respect to geometrical axis 54 for the pair of front wheels.

A drive shaft 55 to the rear axle differential is taken from the second driving wheel of the differential 50, and passes through the tubular shaft 51 above the geometrical axis 54 for the front wheels. The rear output 55 is also here shaped as a comparatively slender element.

The turbine and compressor rotors are interconnected by a planetary gear 56, the ring wheel of which by way of a shaft 57 is connected to a reversing gear 58, not shown in detail. This may contain elements basically corresponding to elements 34, 36 and 37 of FIGS. 1 and 2. The output shaft thereof drives, by way of a pinion 59, ring wheel 60 at which planetary wheels 61 belonging to the differential 50 are mounted.

Figure 4:
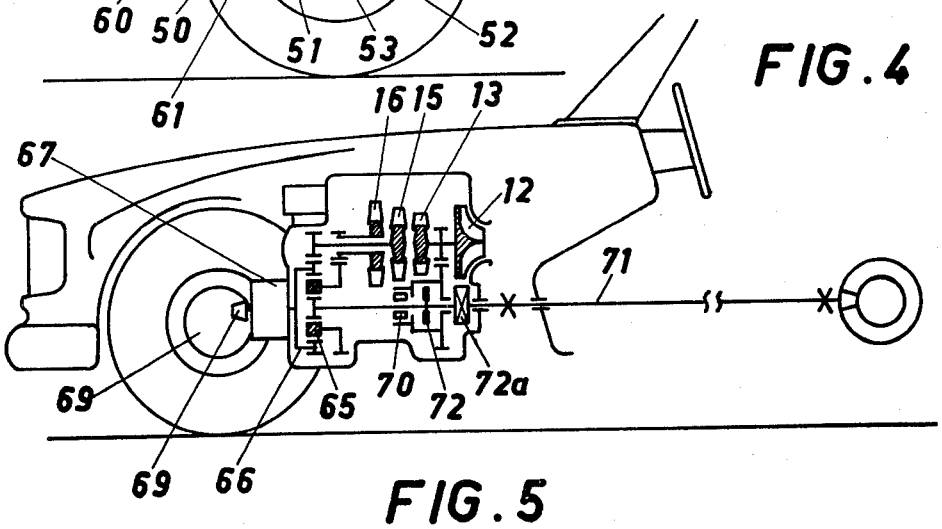

The embodiment according to FIG. 4 mainly corresponds to that according to FIG. 3. The gas turbine is basically the same. The rotors 15 and 16 of the power turbine are primarily interconnected by a planetary gear 65. A ring wheel 66 thereof is connected to a reversing gear 67, from which one shaft extends forwards and carries a bevel pinion 68 cooperating with front axle differential 69.

The sun wheel of planetary gear 65 is, by way of a free wheel 70, connected to the compressor rotor system 12, 13, and as with the previous embodiments, transfer of torque from the power turbine rotor system 15, 16 to the compressor rotor system 12, 13 is made as called for by the occasional operating conditions of the engine. A rear shaft 71 to the rear axle pinion is by way of clutch 72 connectable to the transmission between planetary gear 65 and the compressor rotor system 12, 13 and passes through the hollow shaft formed by free-wheel 70 and clutch 72.

Backwards running will here be occasioned by means of the front wheels only, with the rear drive shaft 71 being disconnected by means of free wheel 72a.

The planetary gear 65 may be of the stepped design, whereby more than one half (for instance 50 to 70%) of the torque may be transferred to the front wheels. It is advantageous to be able to transfer the biggest torque at that end of the engine adjacent to the wheels subjected to the highest wheel pressure, where the best grip on the road is obtainable, and as a result hereof, the rear output shaft 71 and the rear shaft differential may be made still weaker. The location of the engine forwards as above indicated and the distribution of the torque as well as the simple and cheap system for four-wheel driving provides an attractive solution for the driving system of a moderate priced safety car. Corresponding arguments may more or less be applied to arrangements with a rear engine, where it may be advantageous to transfer a correspondingly bigger portion of the torque to the rear wheels. With the engine located in the rear, a bigger space for bumper arrangements in the front, where it is most required, is obtainable.

Figure 5:
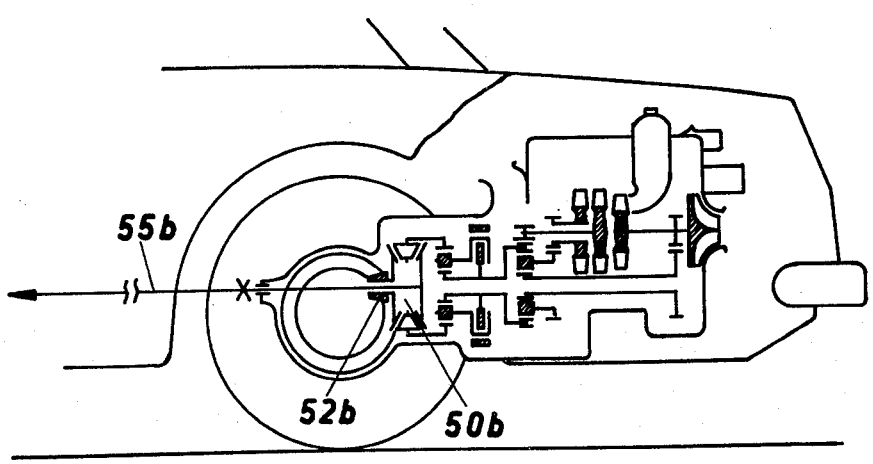
FIG. 5 shows a four-wheel drive with a rear engine and a transmission basically like the one shown in FIG. 3.

FIG. 5 shows an arrangement with a rear engine arranged in basically the same manner as is shown and described in connection with FIG. 3, with the differential, however, being fitted as a direct extension of the reduction gear of the turbine. The same reference numerals are used, but in order to indicate differences, the differential is denoted by 50b, the conical hypoid pinion driving the rear axle differential with 52b and the output shaft extending to the front axle differential (not shown) is denoted by 55b.

It is evident that the main components schematically shown here may be arranged and combined in many different ways, and that the plant, in practical use, will contain further details such as bearings, means for governing, auxiliary apparatus and so forth. The invention has been described as used in certain selected examples, but is, of course, not limited to these but may be varied in many ways within the scope of the appended claims.

The embodiments according to FIGS. 2-5 may, of course, by deletion of certain gear elements (differentials and so forth) be arranged for driving two wheels only, either the front wheels or the rear wheels, and be located in the front or in the rear.

Furthermore, it is possible to delete the planetary gear 56 between the auxiliary turbine 16 and the power turbine 15. A four-wheel drive will then be obtained by letting the power turbine drive one pair of wheels, and the auxiliary turbine drive the other pair of wheels, which, with certain types of cars, will provide a simple, efficient and comparatively cheap arrangement.

What I claim is:

1. In a universal automotive engine for use in driving two pairs of wheels, a gas turbine including a gas producing part and at least two rotors, transmission means for transferring power between the rotors in an integral system, a torque divider connected to said rotors and having two output shafts, at least one hollow shaft in the transmission means, and means for mounting one of said output shafts within said at least one hollow shaft, in which the torque divider is defined by a differential provided with bevel gears, one of the output shafts being displaced with respect to the geometrical axis of the adjacent pair of wheels to permit the other output shaft to pass through said hollow shaft and above the geometrical axis of said pair of wheels.

2. In a universal automotive engine for use in driving two pairs of wheels, a gas turbine including a gas producing part and at least two rotors, transmission means for transferring power between the rotors in an integral system, a torque divider connected to said rotors and having two output shafts, at least one hollow shaft in the transmission means, means for mounting one of said output shafts within said at least one hollow shaft, and a third turbine rotor driving a compressor of the gas producing part, in which the torque divider is defined by a planetary gear having one output shaft connected to a reversing gear at the adjacent pair of wheels, while the other output shaft forms part of the transmission means to the compressor rotor system and continues through a hollow shaft in said part of the transmission means as a driving shaft to the pair of wheels located remotely from the engine.

3. The automotive engine according to claim 2, in which the reversing gear is adapted to transfer torque for backwards movement to the adjacent pair of wheels only, with the other output shaft to the remotely located pair of wheels issuing from said part of the transmission system being provided with a disengageable clutch.

4. An automotive engine according to claim 2, in which the torque divider is defined by a stepped gear providing different amounts of torque to the output shafts.

* * * * *